(No Model.)
W. H. STEVENS.
BICYCLE LOCK.
No. 585,054.  Patented June 22, 1897.
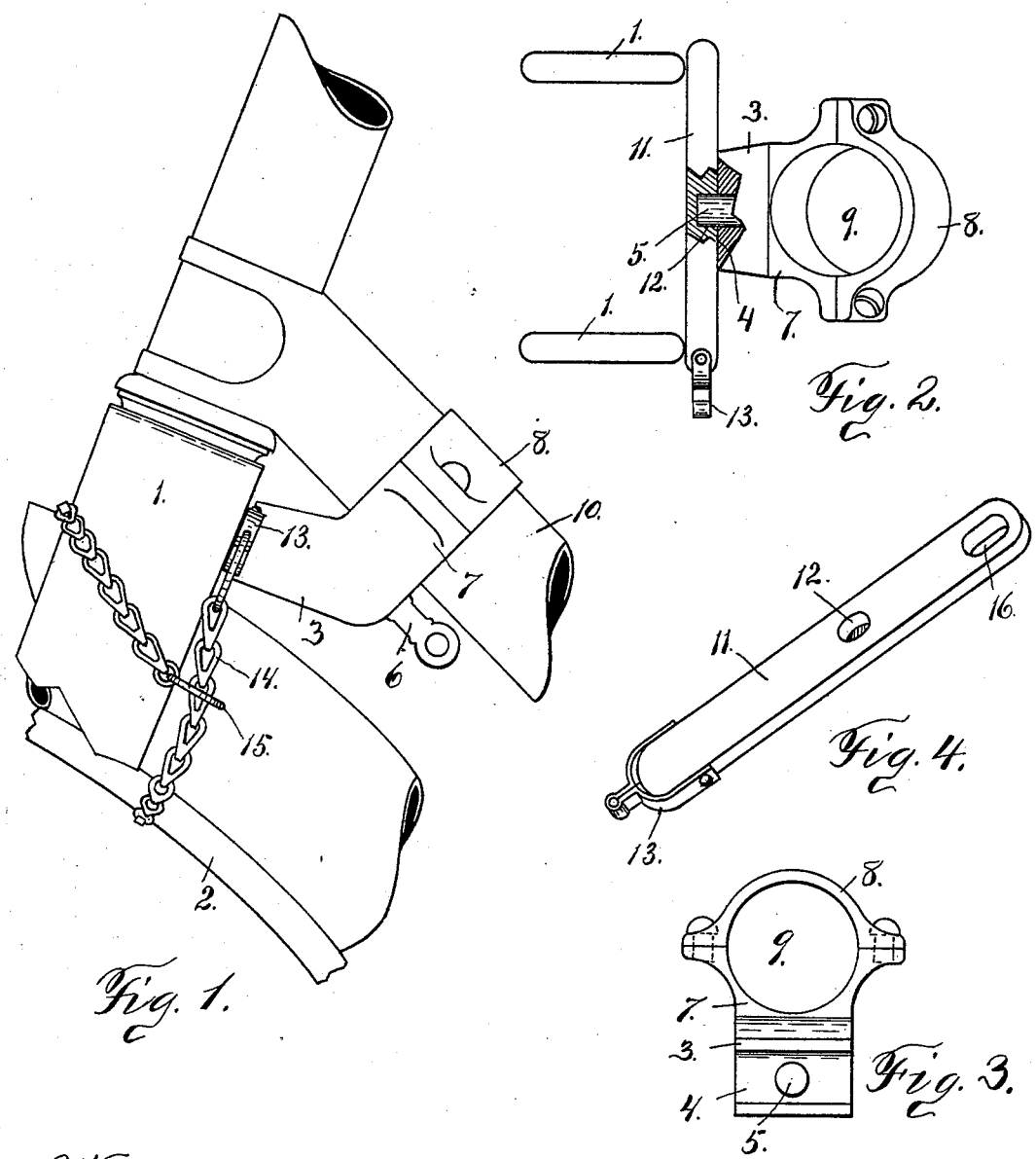
Witnesses:
Inventor.
William H. Stevens
by W. T. Miller
Atty

United States Patent Office.

WILLIAM H. STEVENS, OF BUFFALO, NEW YORK, ASSIGNOR OF ONE-HALF TO PHILIP GERST, OF SAME PLACE.

BICYCLE-LOCK.

SPECIFICATION forming part of Letters Patent No. 585,054, dated June 22, 1897.

Application filed March 12, 1897. Serial No. 627,241. (No model.)

*To all whom it may concern:*

Be it known that I, WILLIAM H. STEVENS, a citizen of the United States, residing at Buffalo, in the county of Erie and State of New York, have invented certain new and useful Improvements in Bicycle-Locks; and I do hereby declare the following to be a full, clear, and exact description of the invention, such as will enable others skilled in the art to which it appertains to make and use the same, reference being had to the accompanying drawings, and to figures of reference marked thereon, which form a part of this specification.

My invention relates to improvements in bicycle-locks and involves a radical departure from the sprocket and other forms of locks now in use.

The primary object of my invention is to provide means by which the fork carrying the front wheel of the bicycle can be temporarily locked or prevented from turning in its socket in the frame, so as to render the wheel useless for riding.

To that end my invention consists of a socket rigidly secured to the bicycle-frame in a position adjacent to the two arms of the fork, a removable bar adapted to lie within the socket and across and adjacent to the two arms of the fork, and means for locking the bar in such position to prevent the fork from turning in its socket.

My invention further consists in combining with the above-outlined construction a chain for locking the front wheel in the locked fork to serve as an additional precaution.

In the drawings, Figure 1 is a side elevation of a fragmentary portion of a bicycle, showing my improved lock in operation. Fig. 2 is a top plan view of the same, partly in section. Fig. 3 is a detached detail view of the socket, and Fig. 4 is a similar view of the bar.

Referring to the drawings, 1 1 are the arms of the front fork of the bicycle, between which the front or steering wheel 2 is journaled.

My improved socket is preferably constructed as follows: 3 is the frame, in which is located the socket proper, 4, consisting of a rectangular groove. In this frame is placed a locking-bolt 5, (see Figs. 2 and 3,) operated by a key 6 in any well-known manner. This frame 3 has an angular extension 7 with separate end portion 8, between which two parts 7 and 8 is the cylindrical opening 9, which encircles the tube 10 of the frame, the two parts 7 and 8 being riveted tightly thereto in such position that the socket 4 will lie adjacent to the two forks 1 1, as clearly shown in Figs. 1 and 2. A rectangular bar 11 is provided with the circular aperture 12 about midway of its length, and at one end is the pivoted clip 13, to which is secured the chain 14, its outer end carrying the ring 15.

The wheel and fork are locked as follows: The chain 14 is passed around the tire of the wheel and one of the arms of the fork and the bar 11 is passed through the ring 15. This operation locks the wheel to the fork and prevents its revolution. Next the bar 11 is slid into the socket 4 until its ends rest against the rear edges of the two arms 1 1 of the fork, as clearly shown in Fig. 2. With the key 6 the bolt 5 is next thrown into engagement with the aperture 12 in the bar 11, (see Fig. 2,) which operation securely locks the fork and prevents its turning in its socket in the frame. The bar 11 can be used without the chain, if desired, as it will be impossible to ride the wheel with the fork locked, as shown.

To adapt the bar 11 for use with an ordinary padlock and chain, I have provided the elongated slot 16. It will be seen that my improved lock is adapted for use with any of the bicycles of the "safety" type now in use. It is inexpensive, easily and quickly applied, and operates as an effectual lock either with or without the chain. To unlock the fork, the key 6 is inserted and turned to slide the bolt 5 out of engagement with the bar 11, which can then be withdrawn from locking contact with the arms 1 1 of the fork.

Any form of lock can be employed to operate the bolt 5, and the frame of the socket 4 can be formed and secured to the bicycle-frame in any well-known manner.

I claim—

1. A lock for bicycles consisting of a socket rigidly secured to the bicycle-frame in a position adjacent to the two arms of the fork, a removable bar adapted to lie within the socket and across and adjacent to the two arms of the fork and means for locking the bar in such position as and for the purpose stated.

2. A lock for bicycles consisting of a socket rigidly secured to the bicycle-frame in a position adjacent to the two arms of the fork, a removable bar adapted to lie within the socket and across and adjacent to the two arms of the fork, means for locking the bar in such position and a chain attached to and operating with the bar for locking the front wheel in the locked fork as and for the purpose stated.

In testimony whereof I have signed my name to this specification in the presence of two subscribing witnesses.

WILLIAM H. STEVENS.

Witnesses:
JOHN A. BELL,
W. T. MILLER.